V. A. FYNN.
ALTERNATE CURRENT MOTOR.
APPLICATION FILED MAY 26, 1910.

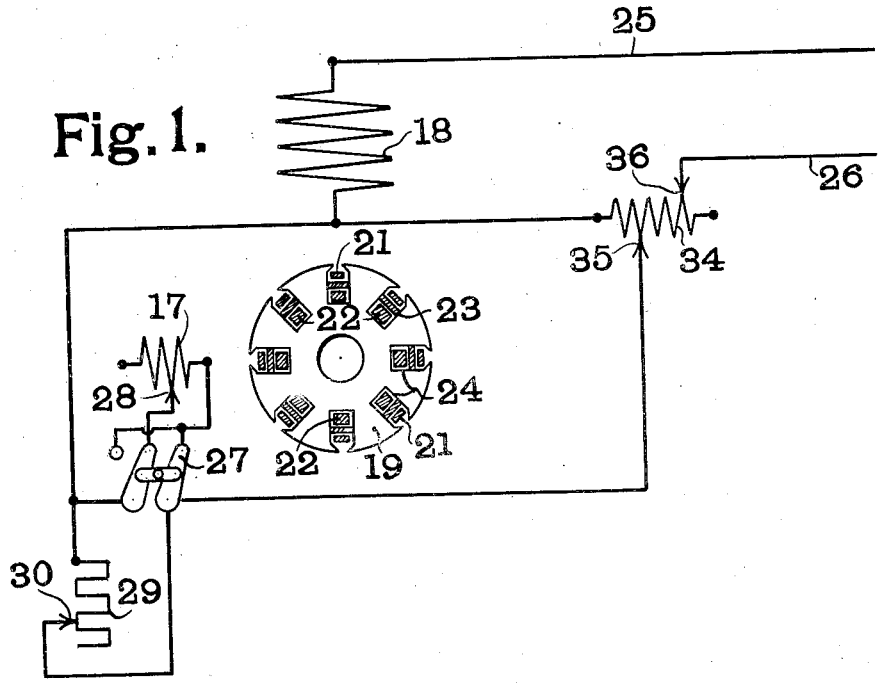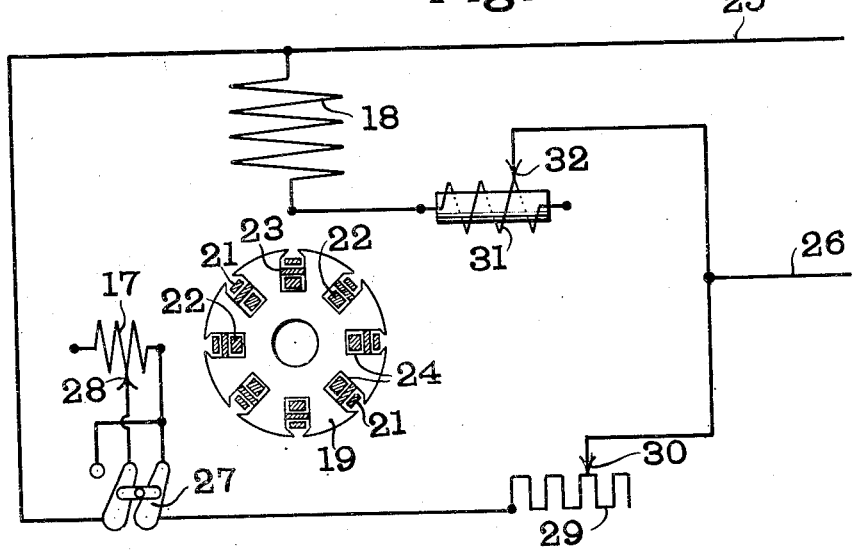

1,050,445.

Patented Jan. 14, 1913.
2 SHEETS—SHEET 2.

WITNESSES:
L. L. Mead.
W. H. Alexander.

INVENTOR
Valère A. Fynn
BY Fowler & Huffman
ATTORNEYS

UNITED STATES PATENT OFFICE.

VALÈRE ALFRED FYNN, OF LONDON, ENGLAND.

ALTERNATE-CURRENT MOTOR.

1,050,445. Specification of Letters Patent. Patented Jan. 14, 1913.

Application filed May 26, 1910. Serial No. 563,540.

*To all whom it may concern:*

Be it known that I, VALÈRE ALFRED FYNN, a subject of the King of England, residing at London, England, have invented a certain new and useful Alternate-Current Motor, of which the following is such a full, clear, and exact description as will enable any one skilled in the art to which it appertains to make and use the same, reference being had to the accompanying drawings, forming part of this specification.

My invention relates more particularly to single phase alternate current induction motors having a permanently short-circuited induced member, such as a squirrel-cage, or to such motors having an induced winding adapted to be permanently short-circuited by means of slip rings or in some like manner.

The principal object of my invention is to cause such single phase motors to start with a powerful torque without the use of a commutator. I achieve this object in my preferred form of motor by providing the induced member with a plurality of polyphase windings closed on themselves, either directly or over resistance; by separating at least two of such windings by a magnetic bridge or shunt; by providing at least two angularly displaced windings on the inducing member; by arranging one of said windings in good inductive relation with the induced member and by arranging the other of said windings in poor inductive relation with the induced member.

My invention and its several advantages will be better understood by reference to the following description, taken in connection with the accompanying diagrammatic drawings of two-pole motors in which—

Figure 3:
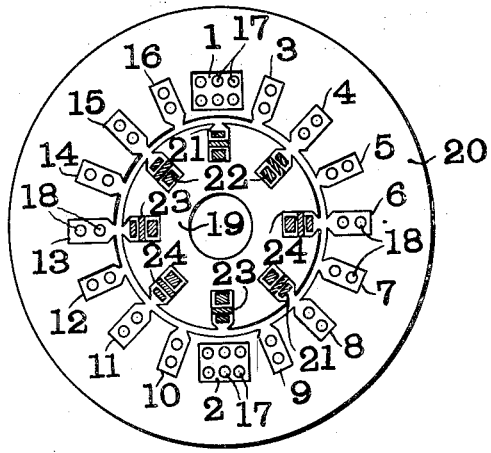
Figure 6:
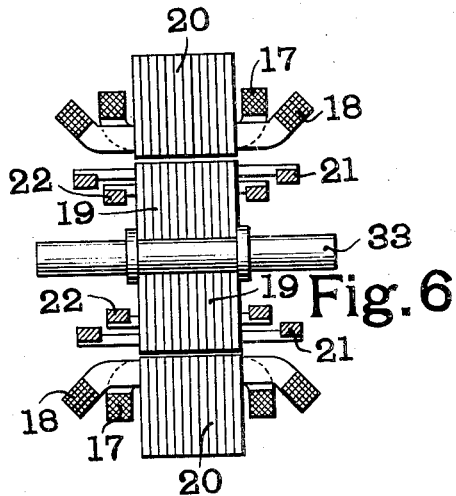
Figure 4:
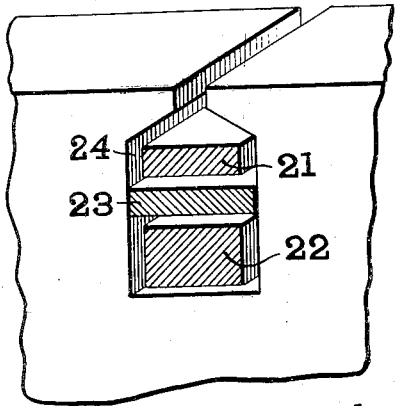
Figure 5:
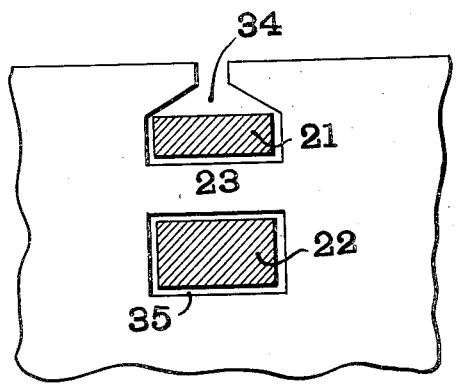

Figure 1 is a diagrammatic representation of my improved motor showing series connections between the stator windings; Fig. 2 is another such diagram showing shunt connections between the stator windings; Fig. 3 shows the preferred arrangement of slots in rotor and stator; Fig. 4 illustrates the preferred arrangement of rotor windings in a rotor slot; Fig. 5 shows a modified arrangement of rotor slots and Fig. 6 is a cross-section through the active material of a complete motor.

Referring to Fig. 1, the rotor 19 is by way of example provided with eight slots 24 carrying two windings 21 and 22 either permanently closed on themselves or adapted to be short-circuited in some well understood manner after the motor has reached a sufficient speed. These windings are separated by a magnetic bridge or shunt 23 which may consist of solid or laminated iron or steel. The arrangement of these windings with a solid magnetic bridge in one and the same slot is shown to a larger scale in Fig. 4. In Fig. 5 is shown one way of separating the windings 21 and 22 by a laminated magnetic bridge. To this end, winding 21 of Fig. 5 is placed in open slots 34 situated near the rotor periphery and winding 22 is placed in closed slots 35 placed some distance away from the rotor periphery and so as to leave a magnetic bridge 23 between the two windings. The bridge more fully illustrated in Fig. 4 is inductively responsive to any flux threading it because such flux can set up Foucault currents therein. I prefer to make use of an inductively responsive magnetic bridge or shunt. The windings 21 and 22 are shown in their preferred squirrel-cage form in Fig. 6. I prefer to give 21 a higher resistance than 22. The stator of the motor shown in Fig. 1 carries two windings 17 and 18 displaced by 90 electrical degrees and connected in series relation. This series relation is here obtained by means of a series transformer 34 adjustable at 35 and 36. It is well understood that this series transformer can often be dispensed with when the two windings would be directly connected in series with each other. The winding 18 is intended to be placed in the best possible inductive relation with the outer rotor winding 21; in order to indicate this diagrammatically in Fig. 1 the winding 18 has been shown much wider than 17 which is intended to be placed in poor inductive relation with 21. These requirements can be fulfilled in practice for instance by distributing winding 18 into many open stator slots per pole and by bunching winding 17 into very few or even into only one slot per pole. If desired, the slot or slots carrying 17 can in addition be set back from the stator bore. Such an arrangement is shown in Fig. 3 where 18 is distributed in the open slots 3, 4 . . . 16 and where 17 is bunched into the closed slots 1, 2 set back from the stator bore. The number of turns of winding 17 of Fig. 1 can be varied by means of switch 28, the direction of the magnetization produced by 17 relatively to that produced by 18 can be changed by means of the reversing switch 27. Switch 28 thus controls the magnitude of the starting torque while switch 27 controls the direction of rotation.

The starting performance can often be improved by adjusting the phase of the current in 17 relatively to the phase of the current in 18. One way of doing this is shown in Fig. 1 where a resistance 29 adapted to be regulated at 30 is connected in parallel with 17. This resistance may also be said to vary the phase of the E. M. F. at the terminals of 18 with respect to the phase of the E. M. F. at the terminals of 17. The machine will start in the one or other direction, according to the position of 27, as soon as the motor is connected to the mains 25, 26. The turns of 17 and the value of the resistance 29 may be adjusted as the speed increases and 17 and 29 may be entirely cut out when a sufficient speed has been reached, yet it is not necessary to cut out 17. I have discovered that when the two stator windings are connected in series relation the machine shows the marked advantage of a torque which steadily increases with increasing speed until the maximum is reached at a speed value in the neighborhood of synchronism. The operation of the machine in its series connection is sufficiently good to permit in some cases the use of only one rotor winding.

In Fig. 2 the stator windings 17 and 18 are connected in parallel, otherwise the details of construction are supposed to be the same as described with reference to Figs. 3, 4, 5 and 6 in connection with Fig. 1.

The starting performance can often be improved by adjusting the phase of the current in 17 relatively to the phase of the current in 18 or by adjusting the phase of the E. M. F. at the terminals of 17 relatively to the phase of the E. M. F. at the terminals of 18. One way of doing this is shown in Fig. 2 where an inductive resistance 31, regulatable at 32 is in circuit with 18 while an ohmic resistance 29 regulatable at 30 is in circuit with 17. The direction of rotation can be reversed by reversing the current through one of the stator windings, for instance through 17 by means of the reversing switch 27. The magnitude of the torque can be varied by adjusting 29, 31 or the number of turns in 17. I prefer to interrupt the circuit containing 17 and to cut 31 out of circuit after the motor has reached a sufficient speed but the machine can be operated with both stator windings in circuit.

Referring to the operation of the machine, winding 18 induces the working current in the rotor windings and the winding 17 produces the flux which is mainly responsible for the torque in conjunction with the working current. The flux due to 17 can be made large without inducing much current in the rotor windings owing to the poor inductive relation between 17 and 21 and the still poorer inductive relation between 17 and 22. As the motor gathers speed the short-circuited rotor winding or windings set up a motor field in the usual way and the effect of the winding 17 automatically becomes of secondary importance, the motor gradually acquiring the well known characteristics of a self-excited shunt induction motor.

Having fully described my invention, what I claim as new and desire to secure by Letters Patent of the United States, is:

1. In an alternating current motor, the combination with an induced member having two windings and a magnetic bridge or shunt separating said windings, of an inducing member provided with two axially displaced windings one of said windings being placed in better inductive relation to the induced member than the other winding.

2. In an alternating current motor, the combination with an induced member having two windings and an inductively responsive magnetic bridge or shunt separating said windings, of an inducing member provided with two axially displaced windings one of said windings being placed in better inductive relation to the induced member than the other winding.

3. In an alternating current motor, the combination with an induced member having two windings and a magnetic bridge or shunt separating said windings, of an inducing member provided with two axially displaced windings, one of said windings being placed in better inductive relation to the induced member than the other winding, and means for controlling the relative phase of the currents in the two windings on the inducing member.

4. In an alternating current motor, the combination with an inducing member provided with a main inducing winding and a field winding axially displaced therefrom and disposed in fewer slots per pole than the main inducing winding, of an induced member having two windings and a magnetic bridge or shunt separating said two windings.

5. In an alternating current motor, the combination with an inducing member provided with a main inducing winding and a field winding axially displaced therefrom and disposed in fewer slots per pole than the main inducing winding, of an induced member having two windings, a magnetic bridge or shunt separating said windings, and means for controlling the phase relation of the magnetizations due to the field winding and the main inducing winding.

6. In an alternating current motor, the combination with an inducing member provided with a main inducing winding disposed in a plurality of slots per pole and a field winding displaced therefrom and disposed in one slot per pole, of an induced member having two windings, and a magnetic bridge or shunt separating said windings.

7. In an alternating current motor, the combination with an inducing member provided with a main inducing winding disposed in a plurality of slots per pole and a field winding axially displaced therefrom and disposed in one slot per pole, of an induced member having two permanently short-circuited windings, a magnetic bridge or shunt separating said windings, and means for controlling the phase relation of the potentials impressed on the main inducing and the field windings.

8. In an alternating current motor, the combination with an inducing member provided with a main inducing winding and a field winding displaced therefrom and disposed in closed slots, of an induced member having two windings and a magnetic bridge or shunt separating said windings.

9. In an alternating current motor, the combination with an induced member provided with a polyphase winding, of an inducing member provided with a main inducing winding and a field winding axially displaced therefrom and connected in series relation therewith, said inducing winding being placed in better inductive relation to the induced member than said field winding.

10. In an alternating current motor, the combination with an induced member provided with a polyphase winding, of an inducing member provided with a main inducing winding and a field winding axially displaced therefrom and connected in series relation therewith, said field winding being disposed in fewer slots per pole than said main inducing winding, and means for controlling the phase relation of the potentials impressed on the main inducing winding and on the field winding.

11. In an alternating current motor, the combination with an inducing member provided with a main inducing winding and a field winding axially displaced therefrom and connected in series relation therewith, said field winding being disposed in fewer slots per pole than said main inducing winding, of an induced member carrying two permanently short-circuited windings, and a magnetic bridge or shunt separating said windings.

12. In an alternating current motor, the combination with an inducing member provided with a main inducing winding and a field winding axially displaced therefrom and connected in series relation therewith, said field winding being disposed in fewer slots per pole than said main inducing winding, of a laminated induced member carrying two permanently short-circuited windings, and a magnetic bridge or shunt separating said windings, said magnetic bridge having at least one element whose dimension in a direction parallel to the motor shaft is greater than the thickness of the laminations of the induced member.

13. In an alternating current motor, the combination with an induced member provided with a polyphase winding, of an inducing member provided with a main inducing winding disposed in open slots and a field winding axially displaced therefrom and connected in series relation therewith, said field winding being disposed in closed slots.

In testimony whereof, I have hereunto set my hand and affixed my seal in the presence of two subscribing witnesses.

VALÈRE ALFRED FYNN. [L. S.]

Witnesses:
E. E. HUFFMAN,
ELIZABETH BAILEY.